US012186602B1

(12) United States Patent
Ray et al.

(10) Patent No.: US 12,186,602 B1

(45) Date of Patent: Jan. 7, 2025

(54) DYNAMIC DAMPER IN THE DUCTWORK OF AN AIR HANDLING SYSTEM

(71) Applicant: Metal-Fab, Inc., Wichita, KS (US)

(72) Inventors: Shaun Ray, Wichita, KS (US); Lorrin Brainard, Kechi, KS (US)

( * ) Notice: Subject to any disclaimer, the term of this patent is extended or adjusted under 35 U.S.C. 154(b) by 644 days.

(21) Appl. No.: 16/829,654

(22) Filed: Mar. 25, 2020

Related U.S. Application Data

(60) Provisional application No. 62/823,123, filed on Mar. 25, 2019.

(51) Int. Cl.

| | |
|---|---|
| ***A62C 2/12*** | (2006.01) |
| ***A62C 2/06*** | (2006.01) |
| ***F24F 11/35*** | (2018.01) |
| ***F24F 13/14*** | (2006.01) |

(52) U.S. Cl.

CPC .................. *A62C 2/12* (2013.01); *A62C 3/14* (2013.01); *F24F 11/35* (2018.01); *F24F 13/1406* (2013.01); *F24F 2013/144* (2013.01); *F24F 2013/146* (2013.01)

(58) Field of Classification Search

CPC .... A62C 2/12; A62C 3/14; F24F 11/35; F24F 13/1406; F24F 2013/144; F24F 2013/146; B69H 1/249

USPC .......................................................... 454/369

See application file for complete search history.

(56) References Cited

U.S. PATENT DOCUMENTS

| | | | | | |
|---|---|---|---|---|---|
| 2,579,395 | A * | 12/1951 | Pfautsch | F24F 13/1406 | 251/303 |
| 2,770,833 | A * | 11/1956 | Drechsel | F16K 1/2028 | 16/268 |
| 3,747,662 | A * | 7/1973 | Kurz | A62C 2/16 | 160/1 |
| 3,785,272 | A * | 1/1974 | McNabney | A62C 2/06 | 49/7 |
| 3,897,828 | A * | 8/1975 | Glover | A62C 37/12 | 169/65 |
| 3,993,096 | A * | 11/1976 | Wilson | F24F 13/10 | 137/512.1 |
| 4,047,475 | A * | 9/1977 | Cox | F24F 7/06 | 454/359 |

(Continued)

FOREIGN PATENT DOCUMENTS

| | | | | |
|---|---|---|---|---|
| AT | 4494 U1 * | 7/2001 | F24F 13/14 |
| BE | 1019828 A3 * | 1/2013 | A62C 2/065 |

(Continued)

*Primary Examiner* — Edelmira Bosques

*Assistant Examiner* — Frances F. Hamilton

(57) ABSTRACT

Apparatus contemplating a damper apparatus for controlling airflow through a ductwork in an air handling system. The damper has a stationary plenum having a collar defining a through opening. A damper blade assembly has a rigid damper blade defining a substantially flat area sized larger than a cross-sectional area of the through opening. The damper blade is selectively positionable between an open position in which the flat area is retained parallel to the collar and thereby clearingly disengages the plenum to open the through opening an thereby permit the airflow to pass through the plenum, and a closed position in which the flat area is perpendicular to the collar and engages against the collar to close the through opening and thereby prevent the airflow from passing through the plenum.

11 Claims, 6 Drawing Sheets

(56) References Cited

U.S. PATENT DOCUMENTS

| | | | | | |
|---|---|---|---|---|---|
| 4,176,587 | A * | 12/1979 | Cox | F24F 7/007 | 454/359 |
| 4,394,958 | A * | 7/1983 | Whitney | F24F 13/1426 | 236/9 A |
| 4,398,371 | A * | 8/1983 | Jenkins | A62C 2/12 | 49/7 |
| 4,632,679 | A * | 12/1986 | Klimczak | B01D 46/04 | 55/284 |
| 4,958,687 | A * | 9/1990 | Nakagawa | F24F 13/1426 | 236/49.2 |
| 6,533,656 | B2 * | 3/2003 | Hertel | F24F 13/1406 | 454/360 |
| 8,202,146 | B1 * | 6/2012 | Johnson | F24F 7/06 | 454/187 |
| 9,175,873 | B2 * | 11/2015 | Sheldon | F24F 13/1413 | |
| 2002/0179159 | A1 * | 12/2002 | Zelczer | F16K 1/221 | 137/601.09 |
| 2008/0248739 | A1 * | 10/2008 | Carlson | A62C 2/242 | 454/270 |
| 2012/0060956 | A1 * | 3/2012 | Zwiernik | F24F 13/0272 | 137/798 |
| 2014/0170961 | A1 * | 6/2014 | Labrecque | F24F 7/10 | 454/259 |
| 2016/0076784 | A1 * | 3/2016 | Dietz | F24F 11/0001 | 454/251 |
| 2017/0363309 | A1 * | 12/2017 | Mills | F24F 13/14 | |
| 2019/0195520 | A1 * | 6/2019 | King, Jr. | F24F 7/02 | |
| 2019/0275863 | A1 * | 9/2019 | Barnes | B60H 1/249 | |

FOREIGN PATENT DOCUMENTS

| | | | | |
|---|---|---|---|---|
| CA | 2629032 | A1 * | 10/2008 | A62C 2/12 |
| DE | 19701358 | A1 * | 7/1998 | A62C 2/12 |
| DE | 10043774 | A1 * | 4/2002 | A62C 2/12 |
| KR | 20160070541 | A * | 6/2016 | |

* cited by examiner

DYNAMIC DAMPER IN THE DUCTWORK OF AN AIR HANDLING SYSTEM

RELATED APPLICATION

This application claims the benefit of the earlier filing date of U.S. Provisional Patent Application Ser. No. 62/823,123 filed on Mar. 25, 2019 and entitled DYNAMIC CEILING DAMPER.

BACKGROUND

This technology is generally related to the field of dynamic-operating fire dampers, such as dynamic ceiling radiation dampers, for preventing the propagation of fire and/or smoke through the ductwork of an air handling system and more particularly, but not by way of limitation, to improvements in sealing off ductwork that is downstream of the fire damper when elevated airflow temperatures indicate the presence of fire conditions.

In the event of a fire in or near an air handling system's ductwork, it is important for a smoke and fire control damper to be capable of withstanding intense heat while holding back the upstream airflow pressure impinging against it for a substantial period of time. Such extreme environmental conditions make it necessary for an effective damper to have a sealing arrangement capable of effectively closing off ductwork, such as an register or a plenum in which the damper resides, to maintain a specified fire and smoke rating.

To meet these rigorous demands, previously attempted solutions tend to employ complex arrangements of rigid, heavy-duty components requiring precise alignments and tight tolerances. The inherent sealing problems of those designs is often exacerbated by a dirty environment inside the ductwork, such as occurs from accumulations of humidity, dust, and other airborne contaminants flowing through the ductwork over a long period of time. Furthermore, the complexities of those arrangements often disadvantageously impose resistance to the airflow producing inefficient losses during normal operations of the air handling system.

Improvements are needed that provide more reliable and robust sealing off of the airflow in the presence of fire conditions without the penalty of airflow energy losses under normal operating conditions. It is to those improvements that embodiments of the present technology are directed

SUMMARY

Some embodiments of this technology contemplate a damper apparatus for controlling airflow through a ductwork in an air handling system. The damper has a stationary plenum defining a through opening. A damper blade assembly has a damper blade defining a substantially flat area sized larger than a cross-sectional area of the through opening. The damper blade is selectively positionable between an open position in which the flat area clearingly disengages the plenum to open the through opening and thereby permit the airflow to pass through the plenum, and a closed position in which the flat area engages against the plenum to close the through opening and thereby prevent the airflow from passing through the plenum.

Some embodiments of this technology contemplate a damper apparatus for controlling airflow through ductwork in an air handling system. The plenum box assembly includes a stationary plenum defining a through opening. A damper blade assembly has a rigid damper blade sized larger than a cross-sectional area of the through opening. The damper blade is selectively rotatable around an axis of rotation between an open position where the damper blade is retracted from the through opening, permitting the airflow to pass through the plenum, and a closed position where the damper blade is biased against the through opening, preventing the airflow from passing through the plenum. The axis of rotation is laterally offset away from the entire through opening.

Some embodiments of this technology contemplate a method for controlling airflow through a ductwork in an air handling system. The method includes steps of obtaining a damper having a stationary plenum defining a through opening, and a damper blade assembly having a damper blade defining a flat area sized larger than a cross-sectional area of the through opening; restraining the damper blade in an open position where the flat area clearingly disengages the through opening to permit the airflow to pass through the plenum; urging the damper blade to a closed position where the flat area engages against the through opening to prevent the airflow from passing through the plenum; and selectively releasing the damper blade from the open position in relation to a temperature of the airflow.

DETAILED DESCRIPTION

Initially, this disclosure is by way of example only, not by limitation. The illustrative constructions and associated methods disclosed herein are not limited to use or application for any specific system or in any specific environment. That is, the disclosed technology is not limited to application as incorporated in a plenum box as is disclosed in the illustrative environment. Alternatively, the skilled artisan will recognize that the principles set forth in the illustrative embodiments of this disclosure can alternatively be employed in other types of ductwork other than within a plenum box. Thus, although the instrumentalities described herein are for the convenience of explanation, shown and described with respect to exemplary embodiments, the skilled artisan understands that the operating principles for isolating airflow coming from or returning to air handling equipment in the case of extreme temperature conditions as set forth herein may be applied equally in other types of systems and environments. The skilled artisan does not need a complete enumeration of all types of such alternative situations to understand the scope of the claimed subject matter, so no such enumeration is attempted.

Figure 1:
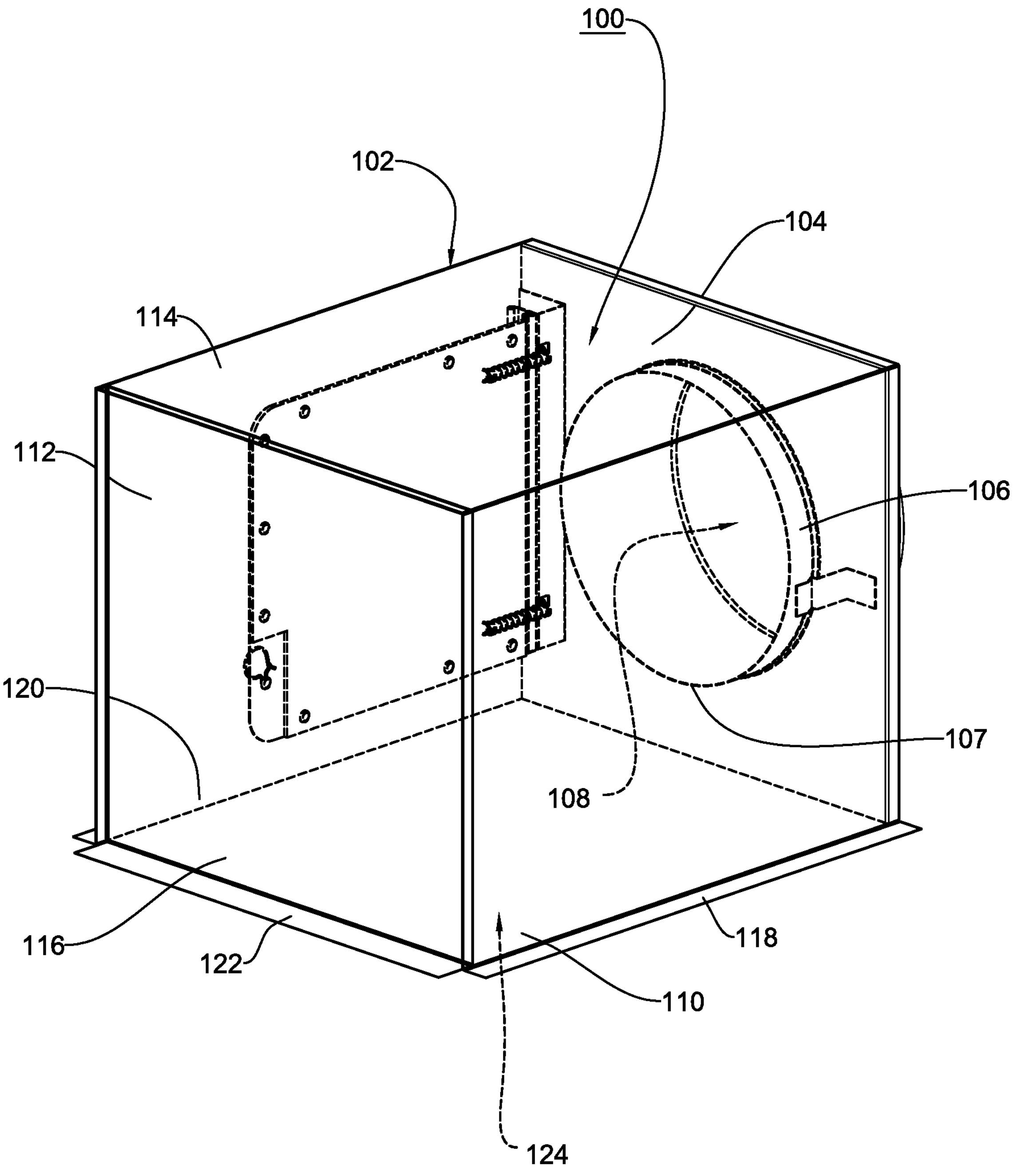
FIG. 1 is a diagrammatic isometric depiction of a dynamic damper in the open position, constructed in accordance with illustrative embodiments of this technology as part of a plenum box in the ductwork of an air handling system.

FIG. 1 generally depicts a dynamic damper 100 constructed in accordance with embodiments of this technology, as it is employed within a plenum box 102 in an air handling system. Typically, the plenum box 102 is constructed of sheet metal panels joined together. The plenum box 102 in these illustrative embodiments is cubical, although the contemplated embodiments are not so limited.

Here, the dynamic damper 100 has a plenum 104 integrally forming a round vent collar 106 protruding into the plenum box 102 and terminating at a distal edge forming a sealing surface 107. Alternatively, the collar 106 can be a discrete component attached to the plenum 104. The collar 106 can also extend out of the plenum box 102 to form an attachment surface for ductwork (not depicted) downstream of the plenum box 102. The collar 106 provides an opening 108 for the airflow passing through the plenum box 102. The opening 108 can direct the airflow to additional distribution ductwork, or to the conditioned space via a ceiling or floor register, and the like.

Three side panels 110, 112, 114 of the plenum box 102 are attached to respective sides of the plenum 104. An end panel 116 joins the distal ends of the side panels 110, 112, 114 together opposite the plenum 104. These panels 110, 112, 114, 116 typically constructed of sheet metal, can include respective flanges 118, 120, 122 to facilitate attaching ductwork (not depicted) delivering airflow into the plenum box 102. Thus, the plenum 104, side panels 110, 112, and end panel 116 cooperatively form an opening 124 for passing airflow through the plenum box 102.

Figure 2:
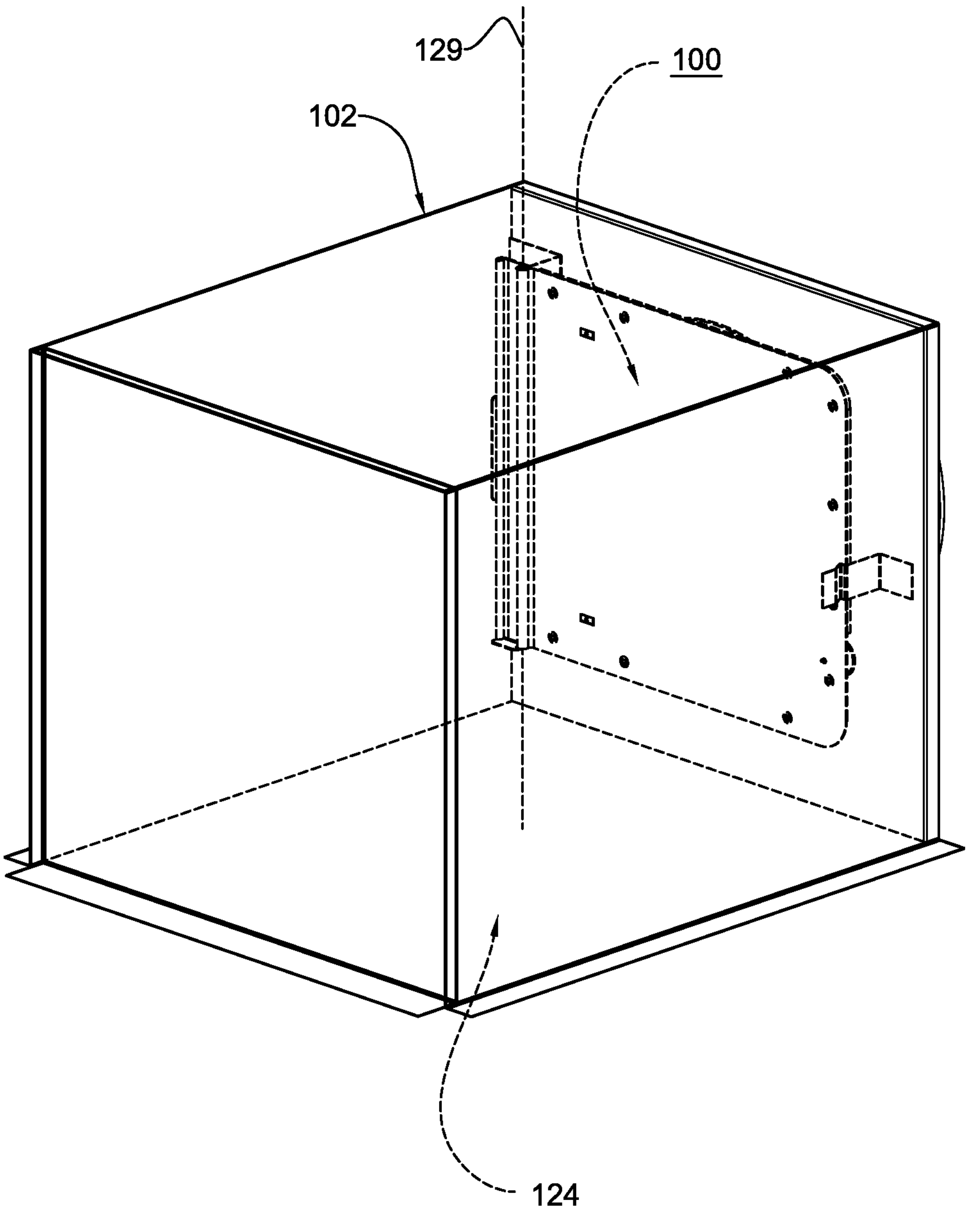
FIG. 2 is similar to FIG. 1 but depicting the dynamic damper in the closed position.

Thusly employed, the dynamic damper 100 of this technology is a fire-protection device incorporated within the plenum box 102 in these illustrative embodiments so that, when activated as depicted in FIG. 2, the dynamic damper 100 springs shut to close the opening 108, thereby isolating the ductwork or delivery register downstream of the plenum box 102 from the air flow generated by or returning to the air handler.

Figure 3:
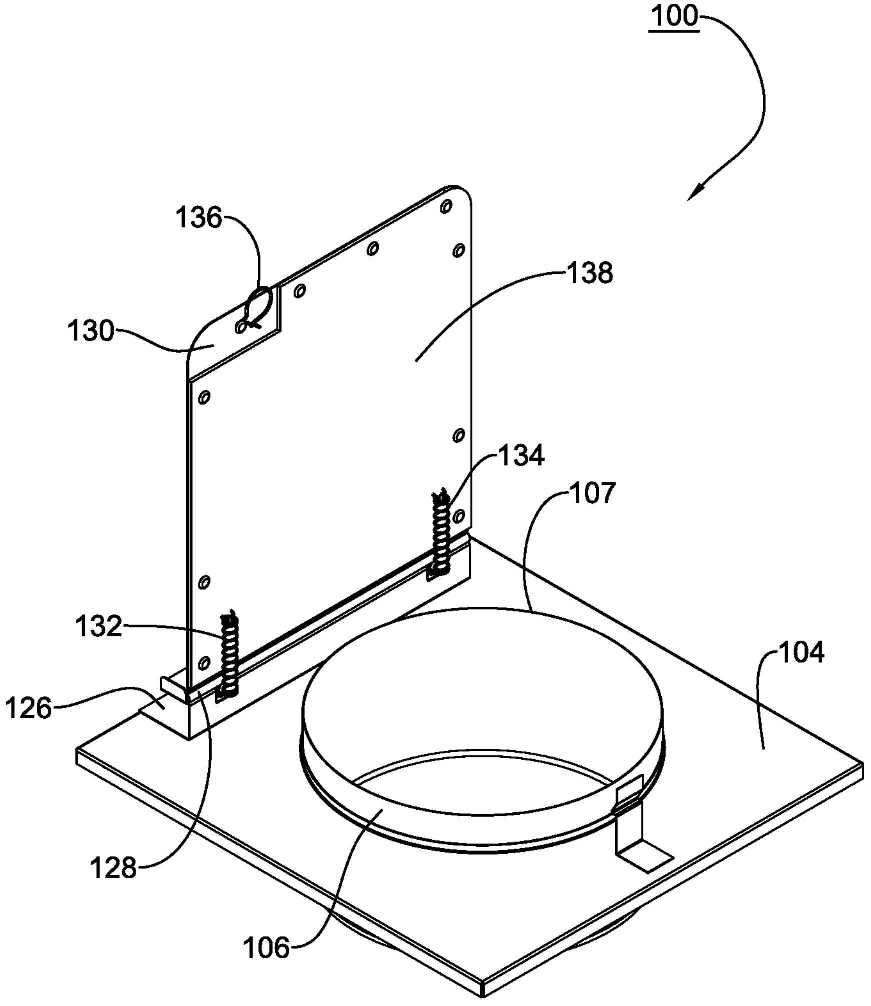
FIG. 3 is an isometric depiction of the dynamic damper in FIG. 1.

FIG. 3 is an isometric depiction of just the dynamic damper 100 of FIGS. 1 and 2, depicted in the open position. The plenum 104 supports a damper blade assembly including a bracket 126 which, in turn, supports a fixed side of a hinge 128. A single-piece, rigid damper blade 130 is attached to the opposing rotatable portion of the hinge 128. Thus, the damper blade 130 selectively rotates around the hinge's axis of rotation 129 (see FIG. 2), which is laterally offset from the entirety of the through opening 108. This arrangement gives the damper blade 130 a freedom of movement between the open position, depicted in FIGS. 1 and 3, to the closed position depicted in FIG. 2.

Generally, the damper blade 130 defines a continuous substantially flat area sized larger than a cross-sectional area of the opening 108. In alternative embodiments (not depicted) the continuous flat area can be formed of two or more components that are rigidly joined together. The term "rigid," for purposes of this description and the claims, means the entire portion of the flat area that closes the through opening 108 is selectively positionable as a continuous, unitary surface that is at least as large as the cross sectional area of the through opening.

The damper blade 130 is selectively positionable between the open position in which its flat area clearingly disengages the plenum 104 to open the opening 108 and thereby pass the airflow through it. In the open position, the damper blade's laterally-offset axis of rotation 129 advantageously provides an arrangement providing no obstruction whatsoever to the through openings 108, 124 by the damper blade assembly. This eliminates airflow losses through the plenum caused by damper blade assembly blockage of the through opening 108. In the closed position, the flat area of the damper blade 130 engages against the plenum 104 to close the opening 108 thereby prevent the airflow from passing through it.

Generally, a biasing force is provided to selectively move the damper blade 130 from a locked-open position to the closed position. In these illustrative embodiments, springs 132, 134 have first ends attached to the bracket 126 and second ends attached to the damper blade 130. The springs 132, 134 are configured to be in tension in the open position of the damper blade 130. The amount of tensile force is adequate to spring-snap the damper blade 130 to the closed position depicted in FIG. 2. The contemplated embodiments are not limited to the depicted springs 132, 134 providing the biasing force acting around the discrete hinge 128. In alterative embodiments, other biasing members can be used instead such as a spring steel web acting around a hinge point, a compressed elastomeric member, and the like.

When installed in the ductwork so that airflow passes through the plenum box's opening 124 into the plenum box, that incoming airflow impinges on the damper blade assembly so as to produce a force urging the damper blade 130 toward the collar's sealing surface 107. This arrangement advantageously employs the upstream airflow as a force that assists in sealing the damper blade against the opening. In alternative installations where airflow passes through the opening 108 into the plenum box, a latch (discussed below) locks the damper blade 130 in the closed position to maintain its sealing engagement with the collar's sealing surface 107.

The damper blade 130 is retained in the open position by a separable linkage (not depicted), such as a thermal linkage having two separable portions fused together by a material with a predictably reliable melting point. An end of one of the separable portions is depicted as it is attached to the damper blade 130 by a spring clip 136. The other end of the other separable portion can be attached to the plenum box 102 (FIGS. 1 and 2) in these illustrative embodiments. The springs 132, 134 impart a torsion to the damper blade 130 which, in part, is opposed by tension in the separable linkage. Below its rated temperature, the thermally separable linkage is configured to provide a greater tensile force than the spring-torsion, thereby locking the blade damper 130 in the open position depicted in FIGS. 1 and 3.

The thermally separable linkage is selected for its fusing material that melts at a temperature that is indicative of a fire situation in the building. When the ambient airflow temperature rises to that predetermined alarm level it melts the fusing material, causing the separable portions to separate from each other. In that situation, the spring-torsion is no longer opposed, so the damper blade 130 is freed up to snap shut against the sealing surface 107 of the vent collar 106.

A sealing material 138 can be applied to the surface of the blade damper 130 so that it is sandwiched between the damper blade 130 and the sealing surface 107 in the closed position of the damper blade 130 depicted in FIG. 2. The sealing material 138 facilitates a superior sealing engagement between the damper blade 130 and the vent collar 106 in comparison to the otherwise metal-to-metal seal. In successful reductions to practice the sealing material 138 was constructed of ceramic fiber material for superior heat resistance, although the contemplated embodiments are not so limited. The sharp metal edge forming the sealing surface 107 in the depicted illustrative embodiments can preferably be modified to prevent it from cutting the sealing material 138 during repeated closures. For example, without limitation, the distal end of the collar 106 can be formed with a flanged end (such as a ¼ inch flange) so that the sealing material 138 pressingly engages against a flat or curved surface instead of a sharp edge.

Figure 4:
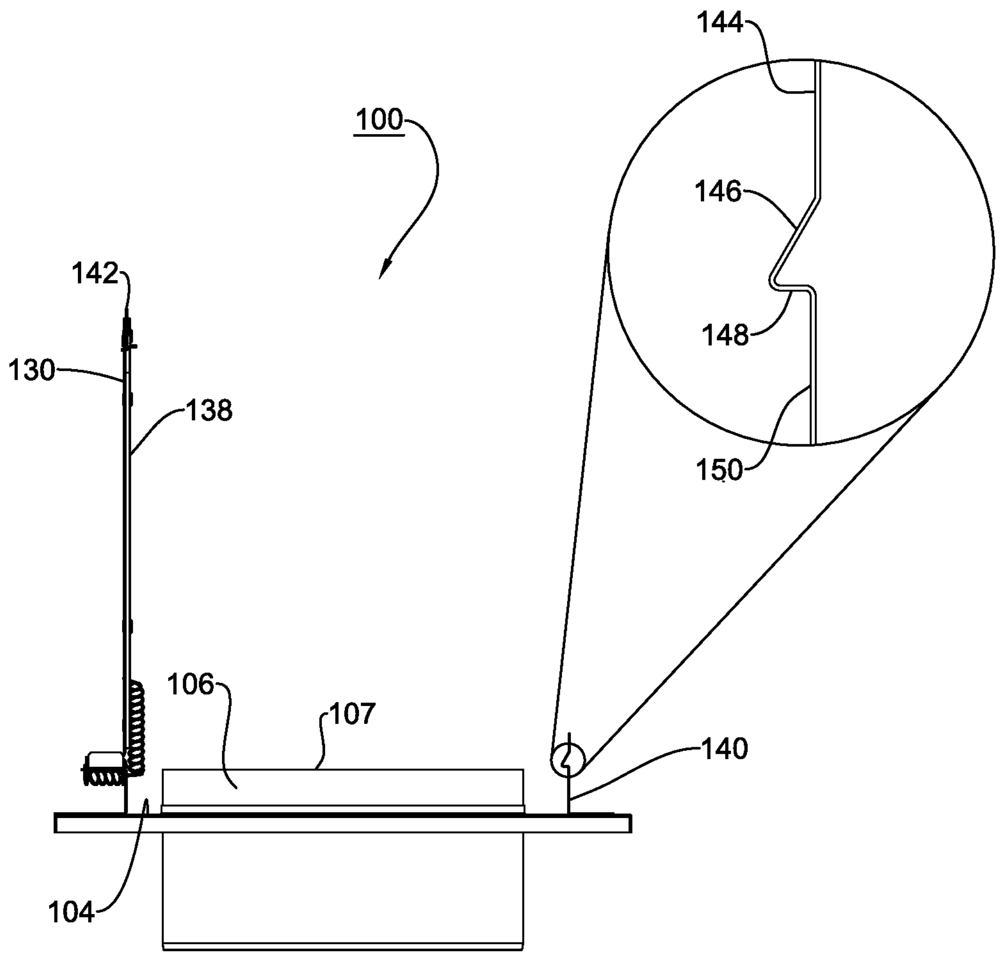
FIG. 4 is a side depiction of the dynamic damper in FIG. 3.

FIG. 4 is a side depiction of the dynamic damper 100 in the open position, like FIG. 3. It better depicts a latch, such as a spring clip 140 in these illustrative embodiments, that restrains the damper blade in its closed position. In these illustrative embodiments, the spring clip 140 is attached at its lower end to the plenum 104 and has a free distal end. The damper blade 130 and spring clip 140 are configured and arranged so that when the damper blade 130 snaps closed, the distal edge 142 of the damper blade 130 strikes against an inner surface 144 of the spring clip 140, deflecting the upright portion of the spring clip 140 in a clockwise rotation in these illustrative embodiments.

Further downward rotation of the damper blade 130 causes its distal edge 142 to then contactingly engage against an angled surface 146 of the upright portion of the spring clip 140, causing further clockwise rotation of the upright portion of the spring clip 140 in these illustrative embodiments. The angled surface 146 of the upright portion of the spring clip 140 terminates at a horizontal notch 148. The damper blade's edge 142 pressing against the angled surface 146 causes the notch 148 to be deflected away from the edge 142, so that the edge 142 passes by the notch 148 as the damper blade 130 moves to its closed position. When the edge 142 ultimately rotates past the angled surface 146, the horizontal notch 148 provides clearance allowing the previously-induced torsion to rotate the upper portion of the spring clip 140 back in the counter-clockwise direction so that a vertical leg 150 abuttingly engages against the distal edge 142 of the damper blade 130 in these illustrative embodiments. Here, in a latched position of the latch, the notch 148 captures the edge 142 of the damper blade 130 to restrain the damper blade in the closed position. The biasing force, such as the springs 132, 134 (FIG. 3), selectively moves the damper blade 130 to the closed position, and the latch, such as spring clip 140, locks the damper blade 130 in the closed position. This prevents any airflow entering the through opening 108 from displacing the damper blade 130 from the collar 106 in the closed position.

Thus, the torsion-loaded spring clip 140 latches the damper blade 130 at its rotational position where the seal 138 is uniformly compressed against the seal surface 107 of the vent collar 106. This latching force places the horizontal notch 148 in position to provide a positive stop against the upper surface of the damper blade 130, preventing a counter-clockwise rotation of the damper blade 130 in the closed position. This enhances the sealing engagement of the damper blade 130 against the vent collar 106, and prevents any reverse airflow through the ductwork from unseating the seal 138 from the sealing surface 107 when the dynamic damper 100 is latched closed as depicted in FIG. 2.

Figure 5:
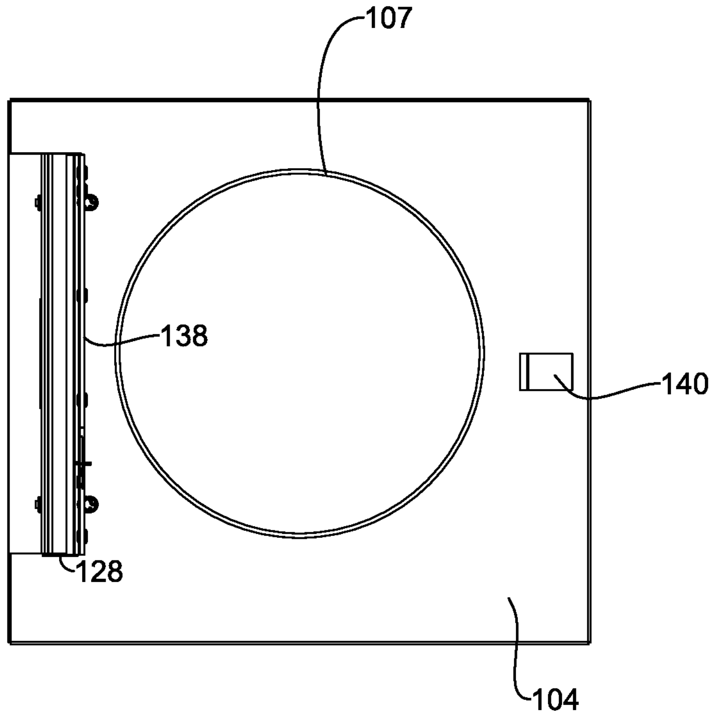
FIG. 5 is a top depiction of the dynamic damper in FIG. 3.
Figure 6:
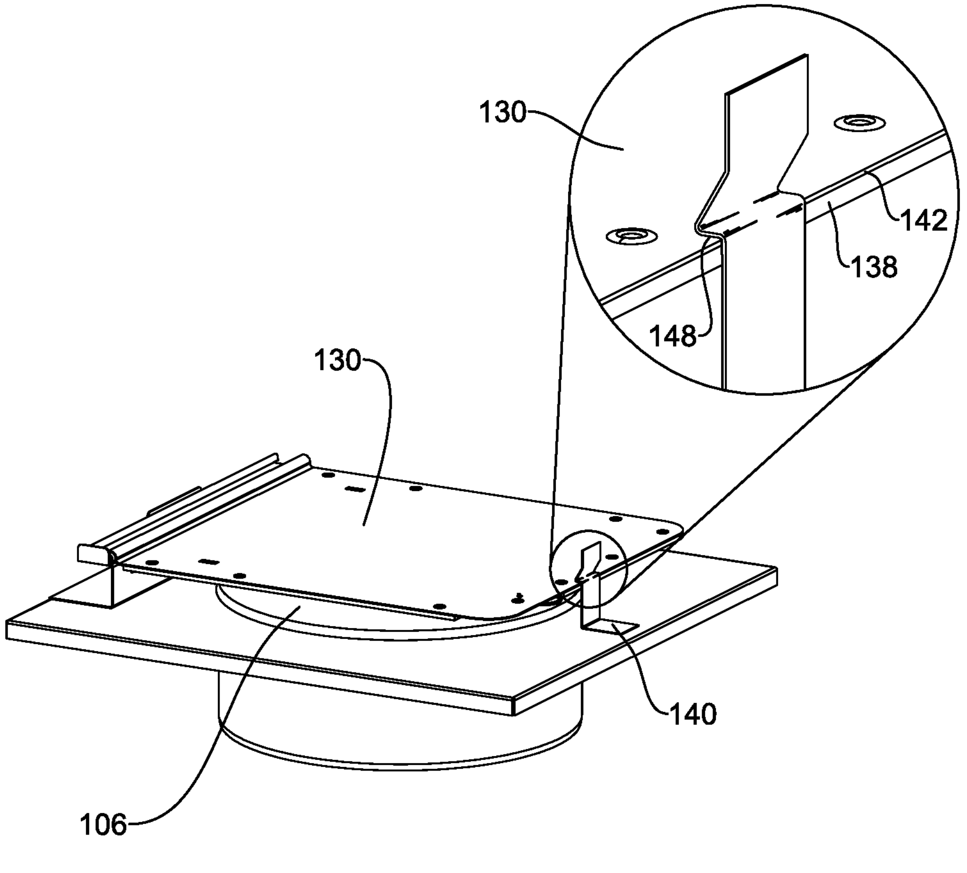
FIG. 6 is an isometric depiction of the dynamic damper in FIG. 2.

FIG. 5 is a top depiction of the dynamic damper 100 in the open position of FIG. 4, best depicting how in these illustrative embodiments only one spring clip 140 opposite the hinge 128 is necessary to latch the damper blade 130 in the closed position. FIG. 6 is an isometric depiction better showing the spring clip 140 latching the damper blade 130 in the closed position. This latching force to lock the damper blade 130 closed can be supplemented by residual tension existing in the springs 132, 134 in the closed position of the damper blade 130.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed:

1. A dynamic damper apparatus for controlling airflow through a ductwork, comprising:

a stationary plenum panel comprising a collar terminating at a distal end that defines a through opening;

a bracket, comprising:

a base connected to the plenum panel; and an upstanding leg extending from the base and supporting a pivot at a predetermined distance apart from the plenum panel;

a damper blade assembly having a damper blade defining a closure area sized larger than an entire cross-sectional area of the through opening, the damper blade supported by the pivot in alignment with the through opening and thereby selectively positionable between an open position in which the closure area is substantially parallel to the collar and thereby contactingly disengages from the plenum panel to open the through opening and permit the airflow to pass through the through opening, and a closed position in which the closure area is perpendicular to the collar and abuttingly contacts against the collar around the entire periphery of the through opening to close the through opening and thereby prevent the airflow from passing through the plenum panel;

a spring clip, attached to the damper blade by one separable portion of a separable linkage, and another separable portion of the separable linkage attached to the plenum box, retaining the damper blade in the open position, and a biasing member urging the damper blade to the closed position.

2. The apparatus of claim 1 wherein the pivot defines an axis of rotation that is laterally offset away from the entire through opening.

3. The apparatus of claim 1 further comprising a plurality of panels connected to the plenum box and collectively forming the ductwork.

4. The apparatus of claim 1 wherein the collar's distal end defines a continuously uninterrupted sealing surface around an entire periphery of the through opening.

5. The apparatus of claim 1 wherein the biasing member is selected from the group consisting of a coil spring, a spring steel component, and an elastomeric member.

6. The apparatus of claim 5 wherein the biasing member comprises a spring connected to the bracket and to the damper blade.

7. The apparatus of claim 1 wherein the damper blade further comprises a seal attached to the closure area, and wherein, in the closed position of the damper blade, the seal is sandwiched between the damper blade's closure area and the collar.

8. The apparatus of claim 7 wherein the seal comprises a ceramic fiber material.

9. The apparatus of claim 1 further comprising a spring clip latch that, in the closed position of the damper blade, restrains the damper blade in the closed position.

10. The apparatus of claim 9 wherein the spring clip latch comprises a spring clip defining an inner surface and a notch such that, when an edge of the damper blade strikes the inner surface, the latch is deflected away from the edge of the damper blade by a rotation of the damper blade in moving to the closed position.

11. The apparatus of claim 10 wherein the notch, in a latched position of the spring clip latch, captures the edge of the damper blade.

* * * * *